Sept. 9, 1958     J. D. BROWN     2,851,069
BAND SAW DETRITUS DEFLECTOR

Filed Oct. 10, 1955     2 Sheets-Sheet 1

Fig. I

Fig. VI

INVENTOR.
JAMES D. BROWN
BY
Marshall, Marshall & Yeasting
ATTORNEYS

Sept. 9, 1958
J. D. BROWN
2,851,069
BAND SAW DETRITUS DEFLECTOR
Filed Oct. 10, 1955
2 Sheets-Sheet 2
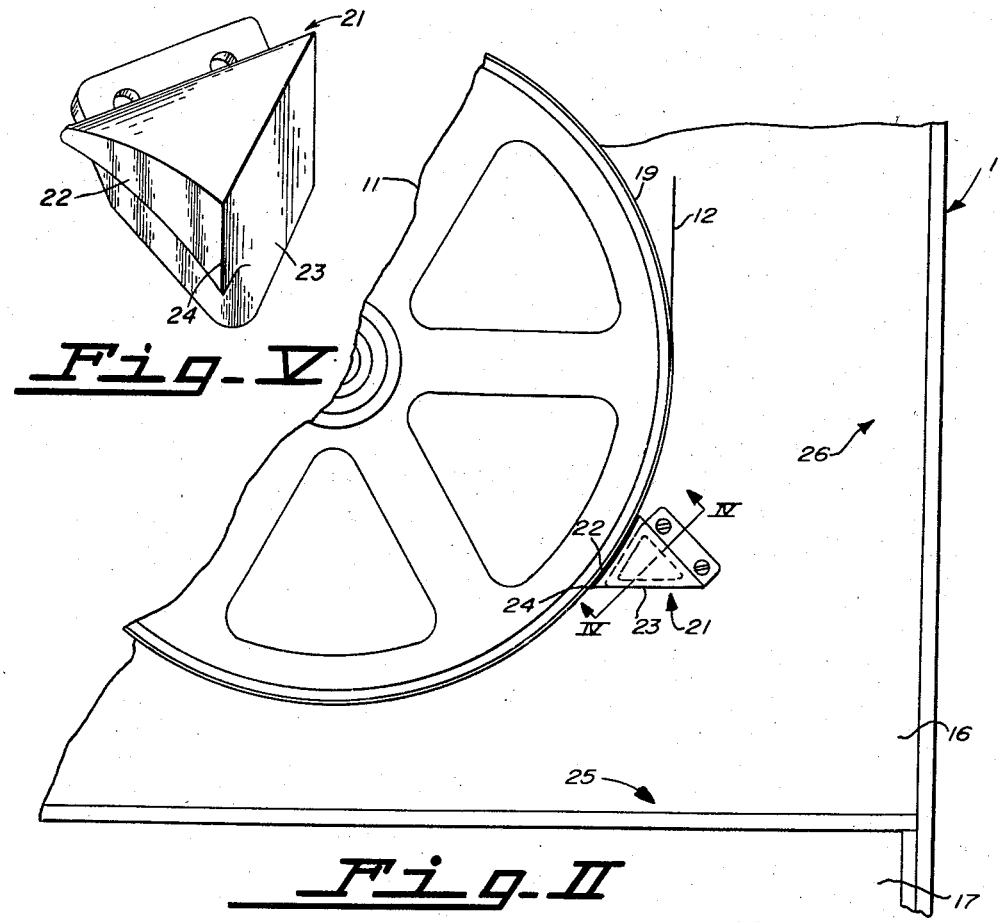
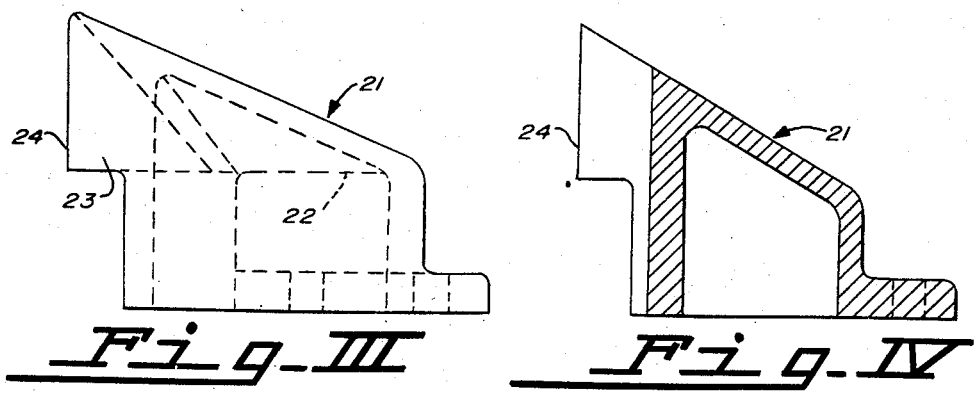
INVENTOR.
JAMES D. BROWN
BY
Marshall, Marshall + Yeasting
ATTORNEYS

United States Patent Office 2,851,069
Patented Sept. 9, 1958

2,851,069

BAND SAW DETRITUS DEFLECTOR

James D. Brown, Toledo, Ohio, assignor, by mesne assignments, to Toledo Scale Corporation, Toledo, Ohio, a corporation of Ohio Application October 10, 1955, Serial No. 539,362

4 Claims. (Cl. 143—158)

This invention relates to meat cutting band saws and particularly to a deflector for cleaning band saw blades.

Heretofore, it has been the practice to provide scrapers for cleaning both lateral surfaces of the web of a meat cutting band saw blade. Such scrapers push waste material from the web into the teeth on the blade helping to cause gobs of material to build up on the teeth, which gobs are projected by centrifugal force into space by the moving saw blade at various points along its path of travel. This requires that the band saw machine along the entire path of movement of the saw blade be frequently cleaned adding materially to the labor cost of maintenance. Centrifugal force alone never completely frees the teeth of the gobs of waste material which keep building up as long as the saw is operated. Apparently, the waste is in the form of fibrous meat shreds tightly wrapped around the teeth.

The principal object of this invention is to provide, in a meat cutting band saw, a deflector mounted along the path of movement of the saw blade in a position to intercept waste material clinging to and protruding from the teeth on the blade and deflect the waste material away from the teeth.

More specific objects and advantages are apparent from the following description of a preferred embodiment of the invention.

According to the general features of the invention, a meat cutting band saw is provided with a deflector in the form of a block mounted along the path of movement of the saw blade about the lower pulley at about the point where the blade changes direction and starts to move upward. The block includes a face shaped to conform with the shape of that section of the saw blade adjacent to the blade and in juxtaposition with the saw blade. Said face and a second face on the deflector meet in a sharp edge which is closely adjacent teeth on the saw blade and which is opposed to waste material clinging to and protruding from the teeth and carried by the moving saw blade toward the deflector. The interception of the waste material causes it to be deflected away from the teeth into one small area in the machine from where it may be easily removed. The deflector removes most of the meat protruding from the teeth and what is left, loosely held between the teeth, is flung by centrifugal force into another small area in the machine so that a remarkably clean blade travels on into the upper saw wheel housing which, heretofore, was fouled up by gobs of meat projected into space by the moving saw blade. Centrifugal force alone cannot free the teeth of the waste material, since apparently it is in the form of fibrous shreds tightly wrapped around the teeth.

A preferred embodiment of the invention is illustrated in the accompanying drawings.

In the drawings:

Figure I is a perspective view of a meat cutting band saw embodying the invention.

Figure II is an enlarged elevational view of the interior of the lower part of the band saw, parts being broken away and certain adjuncts being removed.

Figure III is an enlarged plan view of the deflector which is shown in elevation in Figure II.

Figure IV is a sectional view taken along the line IV—IV of Figure II looking in the direction indicated by the arrows.

Figure V is a perspective view of the deflector which is shown in elevation in Figure II.

Figure VI (Sheet 1) is a perspective view of the deflector and fragments of the saw blade and blade supporting wheel arranged to illustrate the spatial relationships of those elements.

These specific figures and the accompanying description are intended merely to illustrate the invention and not to limit its scope.

The meat cutting band saw generally illustrated in Figure I has a base housing 1 erected on four short legs 2 two of which have leveling nuts 3 parallel with the bottom surfaces of the legs. Forwardly extending supporting bracket members 4 interconnected by means of a plate 5, are fixed to the housing 1 and carry a pair of tracks 6 on which a movable table 7 is mounted to reciprocate. The top of the base housing 1 is formed by a stationary table 8 which lies in the same plane as the movable table 7 forming with the movable table a working surface for handling meat to be cut.

At the rear center portion of the base housing 1 there is erected a hollow vertically upstanding column 9 atop which is located a saw wheel housing 10. A blade moving saw wheel or pulley 11 (Figure II) is rotatably mounted in the base housing 1 and an identical upper saw wheel or pulley (not shown) is rotatably mounted in the saw wheel housing 10. A continuous band saw blade 12 runs on the saw wheels passing upwardly near the outer front surface of the column 9 and downwardly across a throat formed between the underside of the saw wheel housing 10 and the stationary table 8. The rearward stretch of the band saw blade 12 is enclosed by a saw guard 13 attached to the column 9. A driving motor (not shown) is mounted in the base housing 1 and is drivingly connected to the lower saw wheel 11 by a drive belt (not shown). A thickness gauge plate 14 is mounted for fore and aft movement along the right side of the stationary table 8 back of the cutting plane of the blade 12 so that by setting the position of the gauge plate relative to the blade slices of meat of desired thickness may be cut.

The base housing 1 is constructed of sheet metal sections welded into a rectilinear hollow body. An upper side of the base housing 1 is closed by an access door 15 the opening of which gives access to the interior of the base housing 1 which is compartmented. An upper compartment 16 (Figure II) is provided for the lower saw wheel 11 and a lower compartment 17 is provided for the driving motor and its mounting means.

The saw wheel housing 10 is provided with a suitable access door 18 so as to permit ready access to the interior for the operations of removing and replacement of the band saw blade 12 and for ready cleaning of the saw wheel and the housing. The upper and lower saw wheels are provided upon their outer peripheries with shallow flanges 19 against which flanges the rear edge of the band saw 12 may bear.

Heretofore, after the downwardly running saw blade 12 passed through meat on the tables 7 and 8 and then through the slot of a guide 20, it was partially cleaned by the usual scrapers which cleaned only the web of the blade. Such scrapers, of course, may not be permitted to touch the teeth of the blade 12 and serve to push waste material from the web into the teeth on the blade helping to cause gobs of waste material to build up on the teeth, which gobs were projected by centrifugal force into space by the moving saw blade at various points along its path of travel. This required the band saw machine, even the saw wheel housing 10, to be cleaned frequently.

Such conditions have been greatly improved, according to the invention, by mounting a block or deflector 21 beyond the scrapers along the path of travel of the saw blade 12 about the lower pulley at about the point where the blade changes direction and starts to move upward (Figure II). The deflector 21 has a curved face 22 having a radius of curvature about the same as the radius of curvature of the blade moving saw wheel 11 and is in juxtaposition with that section of the blade adjacent the deflector. The deflector never touches any part of the saw wheel 11 including its flange 19 or any part of the saw blade 12. The curved face 22 meets a second face 23 of the deflector in a sharp edge 24 which is closely adjacent teeth on the saw blade and which is opposed to waste material clinging to and protruding from the teeth and carried by the moving saw blade toward the deflector, whereby the waste material is intercepted and deflected away from the teeth into one small area in the compartment 16, generally indicated by the reference numeral 25, where it may be easily removed. Heretofore, much of such waste material was carried into the upper saw wheel housing 10 causing unsanitary conditions to exist, unless the machine was frequently cleaned.

After passing by the deflector 21, the teeth of the saw blade 12 carry only a small amount of waste material, loosely held between the teeth, which is flung by centrifugal force into one area in the compartment 16, generally indicated by the reference numeral 26, where it may be easily removed, so that a remarkably clean blade 12 travels on into the upper saw wheel housing 10. Centrifugal force alone cannot free the teeth of the waste material, since apparently it is in the form of fibrous shreds tightly wrapped around the teeth. The deflector 21 removes most of the meat protruding from the teeth on the blade 12 so that what is left between the teeth seems to leave in a fine spray before the upwardly moving blade passes from the wheel compartment 16.

It will, of course, be understood that various details of construction may be varied over a wide range without departing from the principles of this invention, and it is therefore not the purpose to limit the patent granted hereon otherwise than necessitated by the scope of the appended claims.

Having described the invention, I claim:

1. In a meat cutting band saw, in combination, two vertically spaced and rotatably mounted saw wheels, a continuous band saw blade running on the wheels, and a deflector that is mounted along the path of movement of the blade about the lower wheel at about the point where the blade changes direction, is accelerated radially inward, and starts to move upward and that includes a curved face having a radius of curvature which is about the same as the radius of curvature of the blade moving saw wheel and which is slightly spaced from the curved saw blade, said curved face and a second face on the deflector meeting in a sharp edge which is closely adjacent teeth on the saw blade and which is opposed to waste material clinging to and, by virtue of gravity and centrifugal force, protruding from the teeth, whereby the waste material is intercepted and deflected away from the teeth.

2. In a meat cutting band saw, in combination, two vertically spaced and rotatably mounted saw wheels, a continuous band saw blade running on the wheels, and a block that is mounted along the path of movement of the saw blade outward of said blade at a point along said blade path at which said blade is accelerated radially inward, said block having a face shaped to conform with the shape of that section of the saw blade adjacent the block, said face being slightly spaced from the saw blade and meeting a second face on the block to form a sharp edge which is closely adjacent teeth on the saw blade and which is opposed to waste material clinging to and protruding from the teeth, whereby the waste material is intercepted and deflected away from the teeth.

3. In a meat cutting band saw, a rotatably mounted saw wheel, a continuous band saw blade running on said wheel, the portion of said blade running on said wheel being subjected to acceleration radially inward, a stationary cleaner positioned radially outward of said wheel closely adjacent but spaced from said saw blade at a point where said saw is subjected to acceleration radially inward whereby waste material clinging to said saw and subjected to centrifugal force protrudes from said saw and is intercepted by said cleaner.

4. In a meat cutting band saw, a rotatably mounted saw wheel, a continuous band saw blade running on said wheel, a portion of the saw blade running on said wheel being subjected to radial acceleration toward said wheel, a stationary blade cleaner having an edge portion closely adjacent but spaced from said saw blade positioned radially outward from said saw blade at a point where said blade is subjected to radial acceleration, a deflecting surface on said cleaner extending from said edge at an acute angle to a tangent to the path of said saw blade at a point radially inward of said edge, whereby waste material clinging to said blade protrudes from said blade due to centrifugal force and encounters said edge and is deflected away from said blade by said surface.

References Cited in the file of this patent

UNITED STATES PATENTS

| | | |
|---|---|---|
| 590,209 | Connell | Sept. 21, 1897 |
| 619,490 | Lawrence | Feb. 14, 1899 |
| 659,088 | McKenzie | Oct. 2, 1900 |
| 1,793,461 | Biro | Feb. 24, 1931 |
| 1,870,774 | Gaines | Aug. 9, 1932 |
| 1,908,727 | Bleam | May 16, 1933 |